US012174568B2

(12) United States Patent
Mita

(10) Patent No.: US 12,174,568 B2
(45) Date of Patent: Dec. 24, 2024

(54) IMAGE FORMING APPARATUS

(71) Applicant: Toshiba Tec Kabushiki Kaisha, Tokyo (JP)

(72) Inventor: Katsutoshi Mita, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 18/184,996

(22) Filed: Mar. 16, 2023

(65) Prior Publication Data

US 2024/0310762 A1 Sep. 19, 2024

(51) Int. Cl.
*G03G 15/20* (2006.01)

(52) U.S. Cl.
CPC ....... *G03G 15/205* (2013.01); *G03G 15/2064* (2013.01)

(58) Field of Classification Search
CPC ............. G03G 15/205; G03G 15/2064; G03G 15/2042
See application file for complete search history.

(56) References Cited

U.S. PATENT DOCUMENTS

| | | | | |
|---|---|---|---|---|
| 7,046,937 | B2 | 5/2006 | Matsumoto | |
| 8,669,495 | B2 | 3/2014 | Makihira et al. | |
| 2001/0017992 | A1 | 8/2001 | Hayashi et al. | |
| 2005/0191074 | A1* | 9/2005 | Matsumoto | G03G 15/2042 399/69 |
| 2019/0212676 | A1 | 7/2019 | Tanaka | |
| 2020/0012214 | A1* | 1/2020 | Mita | G03G 15/205 |
| 2020/0333733 | A1* | 10/2020 | Tsuchihashi | G03G 15/2039 |
| 2023/0041473 | A1* | 2/2023 | Song | G03G 15/2042 |

FOREIGN PATENT DOCUMENTS

| | | | |
|---|---|---|---|
| JP | 2002-214959 | A | 7/2002 |
| JP | 2005-275368 | A | 10/2005 |
| JP | 2007-178968 | A | 7/2007 |
| JP | 2007-212589 | A | 8/2007 |
| JP | 2009-122705 | A | 6/2009 |
| JP | 2019-124716 | A | 7/2019 |

* cited by examiner

*Primary Examiner* — Sevan A Aydin
(74) *Attorney, Agent, or Firm* — FOLEY & LARDNER LLP

(57) ABSTRACT

An image forming apparatus includes a conveyor configured to convey a printing medium, an image forming station that forms an image on the printing medium, a fixing device including a fixing roller, a pressurizing roller positioned opposite the fixing roller, and a heater configured to heat a paper passing region between the fixing roller and the pressurizing roller, a temperature sensor that detects a temperature of a first region, the first region including an end of the paper passing region in a paper width direction, and a controller. The controller is configured to lower a set temperature of the heater in response to a determination that (a) a determination condition is satisfied, the determination condition relating to a start of the conveyance of the printing medium to the fixing device by the conveyor and (b) the temperature detected by the temperature sensor is higher than a threshold temperature.

20 Claims, 7 Drawing Sheets

IMAGE FORMING APPARATUS

FIELD

Embodiments described herein relate generally to an image forming apparatus.

BACKGROUND

Some image forming apparatuses uniformly heat, in the paper width direction, a paper passing region where a printing medium passes between a fixing roller and a pressurizing roller. Every time starting a printing operation, the image forming apparatus sets a set temperature of a heating section, which heats the paper passing region, to a predetermined temperature and keeps temperature near both the ends of the paper passing region in the paper width direction at temperature at which a fixing failure does not occur. On the other hand, the temperature of the entire paper passing region rises according to the passage of the printing medium in the paper passing region. Therefore, if the printing medium passes the paper passing region in a state in which the set temperature is kept set at the predetermined temperature, the temperature near both the ends sometimes excessively rises. This is undesirable because a fixing failure or the like near both the ends is caused. In order to solve such a problem, the image forming apparatus performs, according to the passage of the printing medium in the paper passing region, control for lowering the set temperature to temperature lower than the predetermined temperature. However, in the control, if an end of conveyance of the printing medium and a start of the conveyance are performed sequentially in a short time, in some cases, the lowered set temperature is reset to the predetermined temperature and the temperature near both the ends excessively rises.

DETAILED DESCRIPTION

Figure 1:
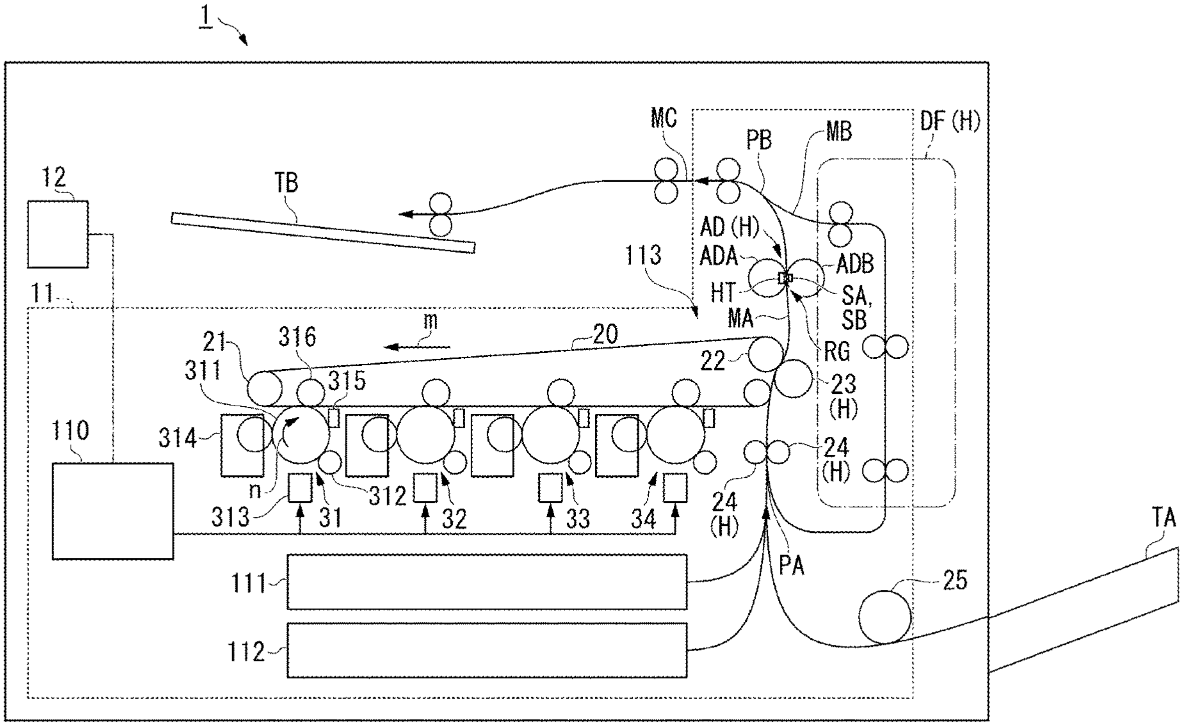
FIG. 1 is a diagram illustrating an example of a configuration of an image forming apparatus according to an embodiment.

An image forming apparatus according to an embodiment is explained with reference to the drawings. In the figures, the same components are denoted by the same reference numerals and signs. An image forming apparatus 1 is explained as an example of the image forming apparatus according to the embodiment.

(Configuration of the Image Forming Apparatus)

A configuration of the image forming apparatus 1 is explained with reference to FIG. 1. FIG. 1 is a diagram illustrating an example of the configuration of the image forming apparatus 1 according to the embodiment.

The image forming apparatus 1 is an apparatus that forms an image on a printing medium. The image forming apparatus 1 is, for example, a multifunction peripheral, a copy machine, or a printer. The image forming apparatus 1 is disposed in, for example, a workplace. The printing medium means a medium on which the image forming apparatus 1 performs processing such as image formation. The printing medium may be any medium if the medium is a sheet-like medium, on at least one of both surfaces of which an image can be formed. The printing medium is, for example, printing paper or a plastic film.

The image forming apparatus 1 specifies, according to operation received from a user, a type of a printing medium as an object on which processing desired by the user is performed. The printing medium is classified according to a size of the printing medium, thickness of the printing medium, a material of the printing medium, and the like.

The image forming apparatus 1 forms, according to operation received from the user, a toner image on a printing medium of a type specified in advance. After forming the toner image on the printing medium, the image forming apparatus 1 heats the printing medium and fixes the toner image on the printing medium as an image.

The image forming apparatus 1 includes, for example, a printer section 11, a control panel 12, a manual feed tray TA, and a paper discharge tray TB. The image forming apparatus 1 may include other members, other devices, and the like in addition to the printer section 11, the control panel 12, the manual feed tray TA, and the paper discharge tray TB.

The printer section 11 includes a control section 110 (e.g., a controller), a paper feeding cassette 111, a paper feeding cassette 112, and an image forming unit 113. The printer section 11 may include other members, other devices, and the like in addition to the control section 110, the paper feeding cassette 111, the paper feeding cassette 112, and the image forming unit 113.

The control section 110 controls the entire image forming apparatus 1. In other words, the control section 110 controls each of the printer section 11, the control panel 12, and the image forming unit 113. The control section 110 may include a processing circuit including a processor and a memory. The memory may store one or more instructions that, when executed by the processor, cause the control section 110 to perform the processes described herein.

The paper feeding cassette 111 stores printing media of a type desired by the user.

The paper feeding cassette 112 stores printing media of a type desired by the user.

The control panel 12 (e.g., a user interface) includes an operation receiving section and a display section.

The operation receiving section receives operation from the user. The operation receiving section is an input device and is, for example, a touch pad or an input key. The operation receiving section outputs information indicating the operation received from the user to the control section 110.

The display section (e.g., a display) displays an image corresponding to the operation received via the operation receiving section. The display section is an image display device and is, for example, a liquid crystal display or an organic electro luminescence (EL) display. The display section may be configured integrally with the operation receiving section as a touch panel.

According to control from the control section 110, the image forming unit 113 conveys a printing medium, forms a toner image on the printing medium, and fixes the toner image on the printing medium as an image. The toner image is a toner image of an image indicated by the image data acquired from the control section 110. A configuration of the image forming unit 113 is explained below. The formation of the toner image on the printing medium may be referred to as formation of an image on the printing medium.

For convenience of explanation, in the following explanation, forming a toner image on a printing medium and fixing the toner image on the printing medium as an image by heating the printing medium is referred to as printing. For convenience of explanation, in the following explanation, a fixing failure of the toner image on the printing medium is simply referred to as fixing failure.

(Configuration of the Image Forming Unit)

A configuration of the image forming unit 113 is explained below.

The image forming unit 113 includes an intermediate transfer belt 20 (e.g., an intermediate transfer element). The image forming unit 113 includes a driven roller 21, a backup roller 22, a secondary transfer roller 23, two registration rollers 24, and a manual paper feeding roller 25. The image forming unit 113 includes four sets of image forming stations, that is, an image forming station 31, an image forming station 32, an image forming station 33, and an image forming station 34. The image forming unit 113 includes a fixing device AD and a duplex printing device DF.

The intermediate transfer belt 20 is a belt onto which toner images are primarily transferred by the four sets of image forming stations. The intermediate transfer belt 20 is supported by the driven roller 21, the backup roller 22, and the like. The intermediate transfer belt 20 rotates in a direction indicated by an arrow m in FIG. 1. More specifically, the image forming unit 113 rotates, with a not-illustrated motor, the intermediate transfer belt 20 in the direction according to control from the control section 110.

The image forming station 31 is an image forming station for yellow (Y) image formation. The image forming station 32 is an image forming station for magenta (M) image formation. The image forming station 33 is an image forming station for cyan (C) image formation. The image forming station 34 is an image forming station for black (K) image formation. In the image forming unit 113, the four sets of image forming stations are disposed in a rotating direction (e.g., counter-clockwise as shown in FIG. 1) of the intermediate transfer belt 20 on the lower side of the intermediate transfer belt 20.

The image forming station 31 includes a photoconductive drum 311, a charging roller 312, an exposure scanning head 313, a developing device 314, a photoconductive cleaner 315, and a primary transfer roller 316. In the image forming station 31, the charging roller 312, the exposure scanning head 313, the developing device 314, the photoconductive cleaner 315, and the primary transfer roller 316 are disposed around the photoconductive drum 311 that rotates in a direction indicated by an arrow n in FIG. 1. The primary transfer roller 316 is opposed to the photoconductive drum 311 via the intermediate transfer belt 20.

The charging roller 312 charges the photoconductive drum 311.

The exposure scanning head 313 forms an electrostatic latent image on the surface of the photoconductive drum 311.

The developing device 314 develops, as a toner image, the electrostatic latent image formed on the surface of the photoconductive drum 311.

The toner image developed on the surface of the photoconductive drum 311 is transferred onto the intermediate transfer belt 20.

A configuration of each of the image forming station 32, the image forming station 33, and the image forming station 34 is the same as such a configuration of the image forming station 31 apart from the color of the formed image. Therefore, in the following explanation, further explanation is omitted about the individual configurations of each of the image forming station 32, the image forming station 33, and the image forming station 34.

The secondary transfer roller 23 is opposed to the backup roller 22 via the intermediate transfer belt 20. The secondary transfer roller 23 secondarily transfers the toner image, which primarily transferred onto the intermediate transfer belt 20, onto a printing medium passing between the secondary transfer roller 23 and the intermediate transfer belt 20.

The two registration rollers 24 (e.g., conveyors) convey a printing medium picked up by a conveying mechanism from each of the paper feeding cassette 111, the paper feeding cassette 112, and the manual feed tray TA to between the secondary transfer roller 23 and the intermediate transfer belt 20.

The manual paper feeding roller 25 picks up a printing medium from the manual feed tray TA and conveys the printing medium to the two registration rollers 24.

The printing medium after the toner image is secondarily transferred thereon by the secondary transfer roller 23 is conveyed to the fixing device AD (e.g., a fixer) that fixes, as an image, the toner image formed on the printing medium. The fixing device AD fixes, as an image, on the printing medium, the toner image secondarily transferred onto the printing medium while conveying the printing medium with a roller. Consequently, the image is formed on the printing medium.

The fixing device AD is a device that fixes the toner image on the printing medium after the toner image is secondarily transferred thereon by the secondary transfer roller 23. More specifically, the fixing device AD heats the printing medium while conveying the printing medium with a roller and fixes, on the printing medium, the toner image secondarily transferred on the printing medium.

The duplex printing device DF is a device that conveys the printing medium after the toner image is fixed on the surface thereof as the image by the fixing device AD to the two registration rollers 24. The printing medium after the front surface and the rear surface thereof are reversed is conveyed to the duplex printing device DF. Therefore, an image is formed, via the secondary transfer roller 23 and the fixing device AD, on the rear surface of the printing medium conveyed to between the two registration rollers 24 via the duplex printing device DF.

(Operation of the Image Forming Unit)

An operation of the image forming unit 113 is explained below.

First, an operation of the four sets of image forming stations is explained with reference to an operation of the image forming station 31 as an example. Each of the four sets of image forming stations is an example of the image forming section.

The image forming station 31 charges the photoconductive drum 311 with the charging roller 312 and, thereafter, exposes the photoconductive drum 311 with the exposure scanning head 313. Consequently, the image forming station 31 forms an electrostatic latent image on the photoconductive drum 311. Thereafter, the image forming station 31 causes the developing device 314 to develop the electrostatic latent image on the surface of the photoconductive drum 311. The developing device 314 develops the electrostatic latent image on the photoconductive drum 311 as a toner image using a two-component developer formed by toner and a carrier. The primary transfer roller 316 primarily transfers the toner image formed on the photoconductive drum 311 in this way onto the intermediate transfer belt 20. After the primary transfer is performed, the photoconductive cleaner 315 removes the toner remaining on the photoconductive drum 311.

The image forming station 31, the image forming station 32, the image forming station 33, and the image forming station 34 form a color toner image on the intermediate transfer belt 20 with the primary transfer roller 316. The color toner image is formed by sequentially superimposing yellow (Y), magenta (M), cyan (C), and black (K) toner images.

Subsequently, an operation of the secondary transfer roller 23 is explained. The secondary transfer roller 23 collectively secondarily transfers the color toner image on the intermediate transfer belt 20 onto a printing medium passing between the secondary transfer roller 23 and the intermediate transfer belt 20. In the following explanation, "toner image" may mean either a color toner image or a toner image of only one color. The toner image may be a toner image formed using decolorable toner.

Subsequently, an operation for conveying a printing medium in the operation of the image forming unit 113 is explained.

In a nip of the two registration rollers 24, a printing medium picked up from each of the paper feeding cassette 111, the paper feeding cassette 112, and the manual feed tray TA is bent by the conveying mechanism. Consequently, the leading end of the printing medium is aligned. Thereafter, the two registration rollers 24 convey the printing medium to between the secondary transfer roller 23 and the intermediate transfer belt 20 according to timing when the image forming unit 113 transfers a toner image onto the printing medium. Conveyance paths on which printing media picked up from the paper feeding cassette 111, the paper feeding cassette 112, and the manual feed tray TA are conveyed to the two registration rollers 24 merge in a merging part PA illustrated in FIG. 1.

In the image forming unit 113, three conveyance paths, that is, a conveyance path MA, a conveyance path MB, and a conveyance path MC are formed by the two registration rollers 24, the fixing device AD, and a plurality of rollers in the duplex printing device DF. The conveyance path MA is a conveyance path extending from the merging part PA to a branching part PB illustrated in FIG. 1. The conveyance path MB is a conveyance path that passes through the duplex printing device DF and is a conveyance path extending from the branching part PB to the merging part PA. The conveyance path MC is a conveyance path extending from the branching part PB to the paper discharge tray TB.

The two registration rollers 24 start rotation to coincide with the position of a toner image on the rotating intermediate transfer belt 20 and move a printing medium to the position of the secondary transfer roller 23. Consequently, the toner image formed on the intermediate transfer belt 20 is secondarily transferred onto the printing medium by the secondary transfer roller 23. After the toner image is secondarily transferred onto the printing medium, the secondary transfer roller 23 conveys the printing medium to the fixing device AD along the conveyance path MA. The fixing device AD fixes the toner image, which is secondarily transferred on the printing medium conveyed from the secondary transfer roller 23, on the printing medium as an image while conveying the printing medium. Consequently, the secondarily transferred toner image is formed on the printing medium as an image. After the image is formed on the printing medium, the fixing device AD conveys the printing medium to the conveyance path MC. The printing medium conveyed to the conveyance path MC is discharged by a not-illustrated roller.

Figure 2:
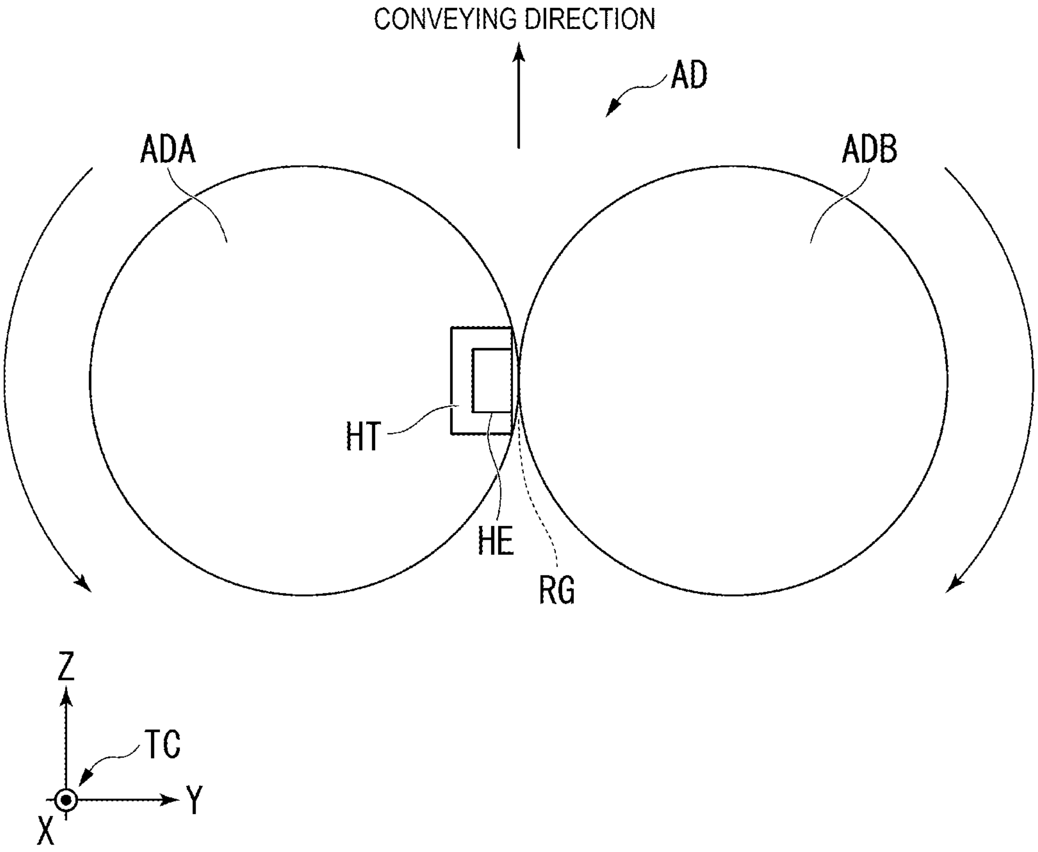
FIG. 2 is a diagram illustrating an example of a configuration of a fixing device.

FIG. 2 is a diagram illustrating an example of a configuration of the fixing device AD. The fixing device AD includes, for example, a fixing member ADA, a pressurizing member ADB opposed to the fixing member ADA, and a heating section HT (e.g., a heater). A three-dimensional coordinate system TC is a three-dimensional orthogonal coordinate system indicating a common direction in figures in which the three-dimensional coordinate system TC is drawn.

The fixing member ADA is a member having an endless circumferential surface. For example, the fixing member ADA is a belt-like member configured as a roller. Therefore, the fixing member ADA may be referred to as a fixing roller. The fixing member ADA comes into contact with the outer circumferential surface of the pressurizing member ADB. The fixing member ADA rotates together with the pressurizing member ADB that is in contact with the fixing member ADA. The heating section HT is provided on the inside of the fixing member ADA. A supporting member that rotatably supports the fixing member ADA is provided on the inside of the fixing member ADA. In FIGS. 1 and 2, the supporting member is omitted in order to simplify the figures. The fixing member ADA rotates around a rotation axis parallel to an X axis of the three-dimensional coordinate system TC illustrated in FIG. 2.

The pressurizing member ADB is a roller that comes into contact with the outer circumferential surface of the fixing member ADA. A driving force of a motor is transmitted to the pressurizing member ADB via a gear or another type of power transmission. In other words, the pressurizing member ADB is rotated by driving of the motor. The pressurizing member ADB rotates around the rotation axis parallel to the X axis of the three-dimensional coordinate system TC illustrated in FIG. 2.

The pressurizing member ADB is pressed against the outer circumferential surface of the fixing member ADA by an urging member or biasing member such as a spring. The pressurizing member ADB is pressed against the fixing member ADA to thereby form a nip in conjunction with the fixing member ADA. In other words, the pressurizing member ADB comes into contact with the fixing member ADA to thereby form a nip in conjunction with the fixing member ADA. Instead of a configuration in which the pressurizing member ADB is pressed against the outer circumferential surface of the fixing member ADA by the urging member, the fixing device AD may have a configuration in which the fixing member ADA is pressed against the outer circumferential surface of the pressurizing member ADB by the urging member.

The heating section HT is a heating device that heats the fixing member ADA. Specifically, the heating section HT is a heating device that is provided in contact with a pressurizing roller on the inside of the fixing member ADA and includes a heat generating section HE that generates heat with a predetermined heating method (e.g., resistive heating). In this case, the heat generating section HE is slidably in contact with the fixing member ADA. The heating section HT heats a paper passing region RG according to rotation of the fixing member ADA heated by the heat generation of the heat generating section HE. The paper passing region RG means a region where a printing medium passes between the fixing member ADA and the pressurizing member ADB. In other words, the paper passing region RG means a region where the fixing member ADA and the pressurizing member ADB are in contact if the printing medium is not passing between the fixing member ADA and the pressurizing member ADB. The heat generating section HE is an undivided single member and includes, on the inside, one or more heat generating bodies that generate heat with the predetermined heating method. The heat generating section HE may be configured to slidably come into contact with the fixing member ADA via a protection layer configured by glass or the like or may be configured to slidably come into contact with the fixing member ADA directly not via the protection layer. The heating section HT heats a region to be heated that can be heated by the heating section HT among regions on the outer circumferential surface of the fixing member ADA. In the examples illustrated in FIGS. 1 and 2, the heating section HT heats, as the region to be heated, a region located in the paper passing region RG among the regions on the outer circumferential surface of the fixing member ADA. Consequently, the heating section HT can heat the surface of a printing medium passing the paper passing region RG. In FIG. 2, the heating section HT is illustrated as an oblong object in order to simplify the figure. In FIG. 2, in order to clearly indicate the position of the paper passing region RG, the fixing member ADA and the pressurizing member ADB are drawn as if the fixing member ADA and the pressurizing member ADB are separated. However, actually, the fixing member ADA and the pressurizing member ADB are in contact as long as a printing medium is not located between the fixing member ADA and the pressurizing member ADB.

Figure 3:
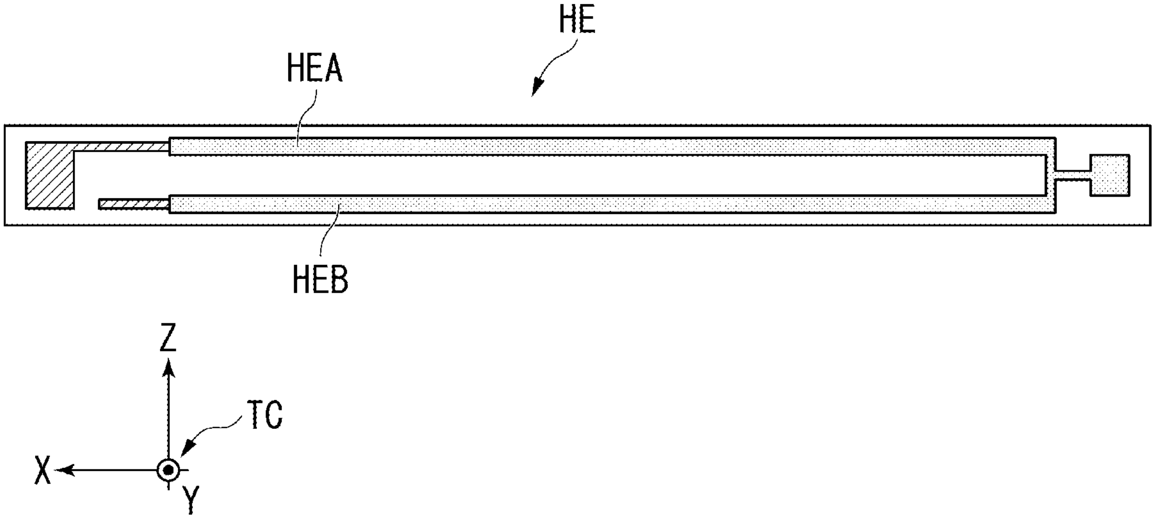
FIG. 3 is a diagram illustrating an example of a configuration of a heat generating section included in a heating section illustrated in FIG. 2.

FIG. 3 is a diagram illustrating an example of a configuration of the heating generating section HE included in the heating section HT illustrated in FIG. 2. As illustrated in FIG. 3, the heat generating section HE is a member having a shape extending in the axial direction of the rotation axis of the fixing member ADA. In the example illustrated in FIG. 3, the heat generating section HE includes two heat generating bodies, that is, a heat generating body HEA and a heat generating body HEB on the inside. The heat generating body HEA and the heat generating body HEB are substantially bar-like heat generating bodies disposed side by side in the conveying direction and extending in the axial direction on the inside of the heat generating section HE. Therefore, in the example, the two heat generating bodies are disposed side by side in the conveying direction in order of the heat generating body HEB and the heat generating body HEA. Consequently, the heat generating section HE can heat the entire region to be heated and, as a result, can heat the entire paper passing region RG. The two heat generating bodies are configured by a resistor such as a silver palladium alloy and generates heat through energization by the control section 110. That is, in this case, the predetermined heating method is a heating method by energization to the resistor. In the example, the two heat generating bodies are provided on a substrate on which wires are printed. A connection form of the wires illustrated in FIG. 3 is only an example and may be another connection form. The two heat generating bodies may be integrally configured. A more detailed configuration of the heat generating section HE illustrated in FIG. 3 is described in, for example, JP-A-2007-212589. Therefore, in this embodiment, more detailed explanation is omitted about the configuration of the heat generating section HE illustrated in FIG. 3.

Figure 4:
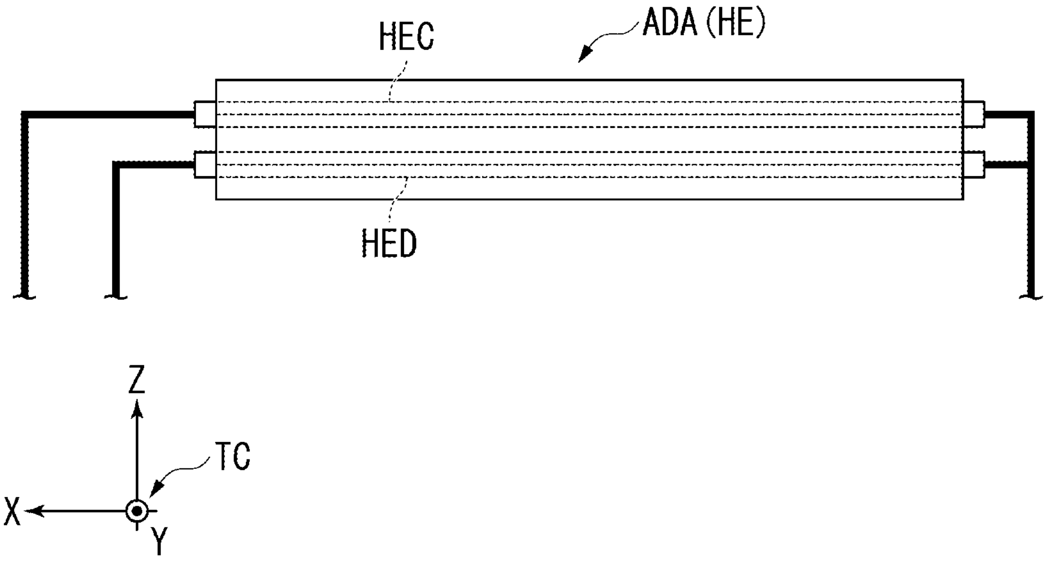
FIG. 4 is a diagram illustrating another example of the configuration of the heat generating section included in the heating section.

The heat generating section HE of the heating section HT may be configured as illustrated in FIG. 4 instead of being configured as illustrated in FIG. 3. FIG. 4 is a diagram illustrating another example of the configuration of the heat generating section HE included in the heating section HT illustrated in FIG. 2. In the example illustrated in FIG. 4, the heat generating section HE is configured integrally with the fixing member ADA. The heat generating section HE includes, on the inside, two heat generating bodies, that is, a heat generating body HEC and a heat generating body HED. The heat generating body HEC and the heat generating body HED are substantially bar-shaped lamps disposed side by side in the conveying direction and extending in the axial direction of the rotation axis of the fixing member ADA on the inside of the heat generating section HE. Therefore, in this example, the two heat generating bodies are disposed side by side in the conveying direction in order of the heat generating body HED and the heat generating body HEC. In this case, the region to be heated explained above is the entire fixing member ADA. Consequently, the heat generating section HE can heat the entire fixing member ADA and, as a result, can heat the entire paper passing region RG. For example, the two heat generating bodies emit light and generate heat through energization by the control section 110 and heat the entire fixing member ADA with radiated heat. That is, in this case, the predetermined heating method is a heating method using radiated heat generated by energization to the lamps. The two heat generating bodies are connected to the control section 110 by wires. A connection form of the wires illustrated in FIG. 4 is only an example and may be another connection form. The two heat generating bodies may be integrally configured. A more detailed configuration about the heat generating section HE illustrated in FIG. 4 is described in, for example, JP-A-2005-275368. Therefore, in this embodiment, more detailed explanation is omitted about the configuration of the heat generating section HE illustrated in FIG. 4.

Figure 5:
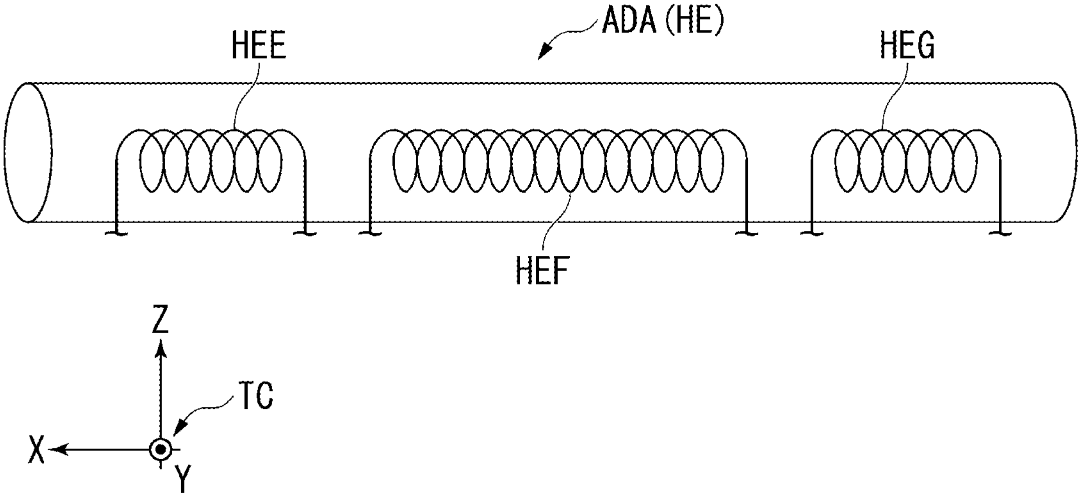
FIG. 5 is a diagram illustrating still another example of the configuration of the heat generating section included in the heating section.

The heat generating section HE of the heating section HT may be configured as illustrated in FIG. 5 instead of being configured as illustrated in FIGS. 3 and 4. FIG. 5 is a diagram illustrating still another example of the configuration of the heat generating section HE included in the heating section HT illustrated in FIG. 2. In the example illustrated in FIG. 5, the heat generating section HE is configured integrally with the fixing member ADA. The heat generating section HE includes, on the inside, three heat generating bodies, that is, a heat generating body HEE, a heat generating body HEF, and a heat generating body HEG.

The three heat generating bodies are electric heating coils disposed side by side in the axial direction of the rotation axis of the fixing member ADA and extending in the axial direction on the inside of the heat generating section HE. Therefore, in the example, the three heat generating bodies are disposed side by side in the negative direction of the X axis of the three-dimensional coordinate system TC in order of the heat generating body HEE, the heat generating body HEF, and the heat generating body HEG. Consequently, the heat generating section HE can heat the entire fixing member ADA and, as a result, can heat the entire paper passing region RG. For example, the three heat generating bodies generate heat through energization by the control section 110. That is, in this case, the predetermined heating method is a heating method by energization to the electric heating coil. The three heat generating bodies are connected to the control section 110 by wires. A connection form of the wires illustrated in FIG. 5 is only an example and may be another connection form. The three heat generating bodies may be integrally configured. A more detailed configuration about the heat generating section HE illustrated in FIG. 5 is described in, for example, JP-A-2009-122705. Therefore, in this embodiment, more detailed explanation is omitted about the configuration of the heat generating section HE illustrated in FIG. 5.

The heating section HT having the configuration illustrated in FIGS. 3 to 5 may be provided on the inside of the pressurizing member ADB instead of being provided on the inside of the fixing member ADA.

Figure 6:
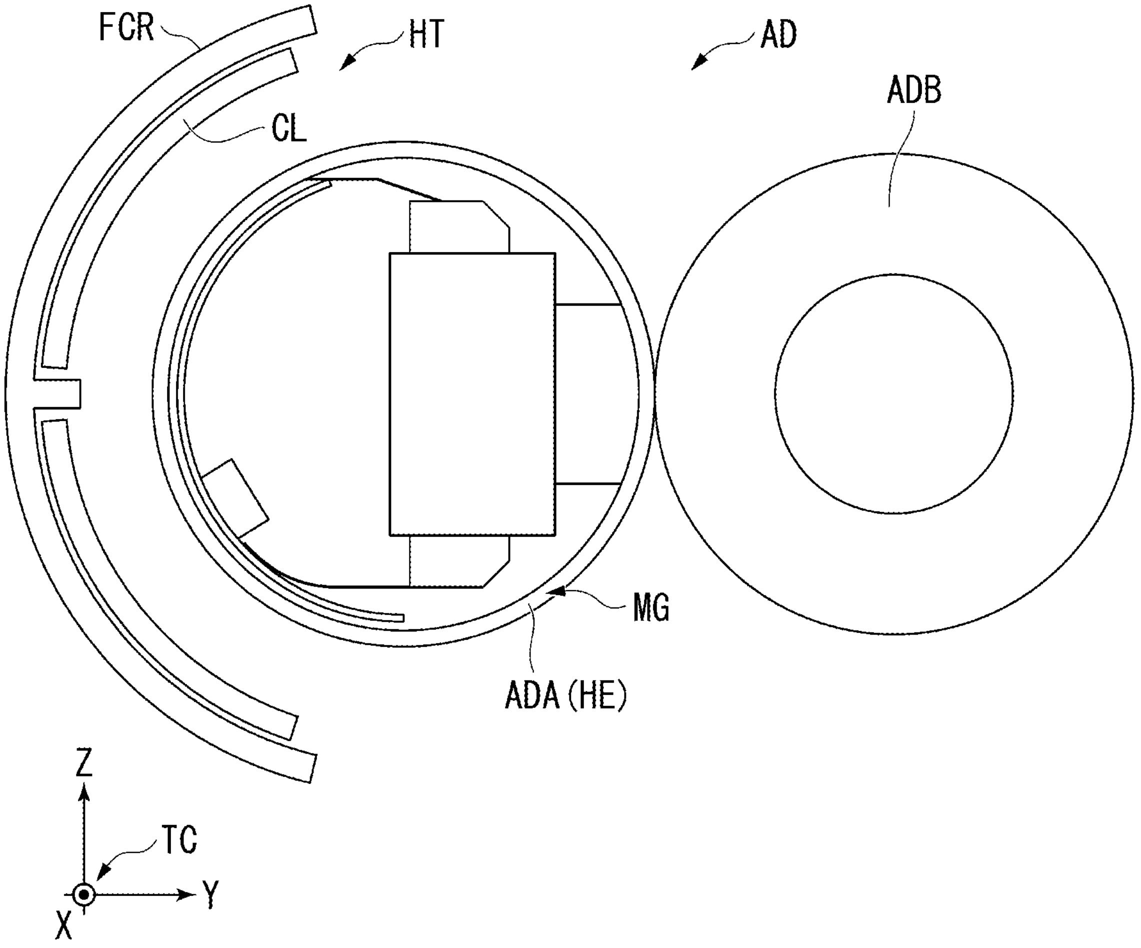
FIG. 6 is a diagram illustrating another example of the configuration of the fixing device.

The heating section HT may be a heating device of an induction heating (IH) type illustrated in FIG. 6 instead of the heating device having the configuration illustrated in FIGS. 3 to 5. FIG. 6 is a diagram illustrating another example of the configuration of the fixing device AD. The heating section HT included in the fixing device AD illustrated in FIG. 6 is a heating device of the IH type. The heating section HT includes a ferrite core FCR, an IH coil CL provided in the ferrite core FCR, and the fixing member ADA including a heat generating body MG that generates heat with a magnetic flux generated from the IH coil CL. In this case, the fixing member ADA is the heat generating section HE as well and includes the heat generating body MG as a heat generation layer together with a base layer of polyimide resin or the like and a heat resistant elastic layer of silicon rubber or the like.

The ferrite core FCR is provided on the outside of the fixing member ADA such that a magnetic flux generated from the IH coil CL concentrates on the fixing member ADA. In the example illustrated in FIG. 6, the ferrite core FCR is bent along the outer circumferential surface of the fixing member ADA and is provided in a position on the opposite side of a position where the pressurizing member ADB is located among positions opposed to the fixing member ADA.

The IH coil CL is a coil that is provided on the inner circumferential surface of the ferrite core FCR and generates a magnetic flux corresponding to an AC current supplied from the control section 110. The inner circumferential surface of the ferrite core FCR means a surface opposed to the outer circumferential surface of the fixing member ADA among surfaces of the ferrite core FCR. In other words, the inner circumferential surface of the ferrite core FCR means a surface facing the fixing member ADA among the surfaces of the ferrite core FCR. The IH coil CL heats, with the generated magnetic flux, the heat generating body MG included in the fixing member ADA as the heat generating layer. That is, the IH coil CL heats the fixing member ADA with the generated magnetic flux.

The heat generating body MG only has to be an object that functions as the heat generating layer included in the fixing member ADA and generates heat with the magnetic flux generated by the IH coil CL. The heat generating body MG is made of nonmagnetic metal such as nickel or copper but is not limited to this. The fixing member ADA includes such the heat generating body MG as the heat generating layer and can heat the surface of a printing medium with heat generation of the heat generating body MG functioning as the heat generating layer.

A more detailed configuration about the fixing device AD illustrated in FIG. 6 is described in, for example, JP-A-2019-124716. Therefore, in this embodiment, more detailed explanation is omitted about the configuration of the heat generating section HE illustrated in FIG. 6.

The configurations of the heating section HT and the fixing device AD may be any other configurations as long as the function of the fixing device AD explained in this embodiment is not spoiled.

With the configuration explained above, the fixing device AD includes the heating section HT that heats the paper passing region RG and the fixing device AD heats a printing medium passing the paper passing region RG by heating the paper passing region RG with the heating section HT and fixes, on the printing medium, a toner image formed on the printing medium by the four sets of image forming stations. Consequently, the toner image secondarily transferred by the secondary transfer roller 23 is formed on the printing medium as an image. After the image is formed on the printing medium, the fixing device AD conveys the printing medium to the conveyance path MC. The printing medium conveyed to the conveyance path MC is discharged by a not-illustrated roller.

In the case of duplex printing, after an image is formed on the front surface of the printing medium and, then, the entire printing medium passes the branching part PB, the not-illustrated roller conveys the printing medium to the conveyance path MB by performing switchback. Consequently, the front surface and the rear surface of the printing medium are reversed. Thereafter, the plurality of rollers in the duplex printing device DF conveys the printing medium to the nip of the two registration rollers 24 along the conveyance path MB. The printing medium, the front surface and the rear surface of which are reversed, is conveyed along the conveyance path MA through the two registration rollers 24. The toner image is fixed on the printing medium as an image by the fixing device AD. Consequently, the image is formed on the rear surface of the printing medium as well. The fixing device AD conveys the printing medium, on the rear surface of which the image is formed, to the conveyance path MC and discharges the printing medium. The image formed on the front surface of the printing medium and the image formed on the rear surface of the printing medium may be different images or may be the same image.

In this way, the secondary transfer roller 23, the two registration rollers 24, the fixing device AD, and the various rollers in the duplex printing device DF configure a conveying section H (e.g., a conveyor assembly, a conveyor) that conveys a printing medium in the image forming apparatus 1.

(Configuration for Detecting Temperatures of a First Region and a Second Region)

In the example illustrated in FIG. 1, the image forming apparatus 1 includes a first detecting section SA and a second detecting section SB. The image forming apparatus 1 may not include the first detecting section SA. In this case, the first detecting section SA is communicably connected to the image forming apparatus 1 from the outside. The image forming apparatus 1 may not include the second detecting section SB. In this case, the second detecting section SB may be communicably connected to the image forming apparatus 1 from the outside or the second detecting section SB may not be connected to the image forming apparatus 1.

The first detecting section SA is a temperature sensor that detects the temperature of a first region. The first region means a region of one or both of both the ends of the paper passing region RG in the paper width direction among regions included in the paper passing region RG. In other words, the first region means one or both of a region including a first end portion among the regions included in the paper passing region RG and a region including a second end portion among the regions included in the paper passing region RG. The first end portion means one of both the ends of the paper passing region RG in the paper width direction. The second end portion means the other of both the ends of the paper passing region RG in the paper width direction. As an example, a case in which the first region means the region including the first end portion is explained. In this case, the first detecting section SA is provided in a position where the temperature of the region including the first end portion can be detected. The first detecting section SA outputs information indicating the detected temperature to the control section 110.

The second detecting section SB is a temperature sensor that detects the temperature of a second region. The second region is a region not overlapping the first region. The second region means a region near the center of the paper passing region RG in the paper width direction among the regions included in the paper passing region RG. In other words, the second region means a region including the center of the paper passing region RG in the paper width direction among the regions included in the paper passing region RG. The second detecting section SB is provided in a position where the temperature of the second region can be detected. The second detecting section SB outputs information indicating the detected temperature to the control section 110.

Figure 7:
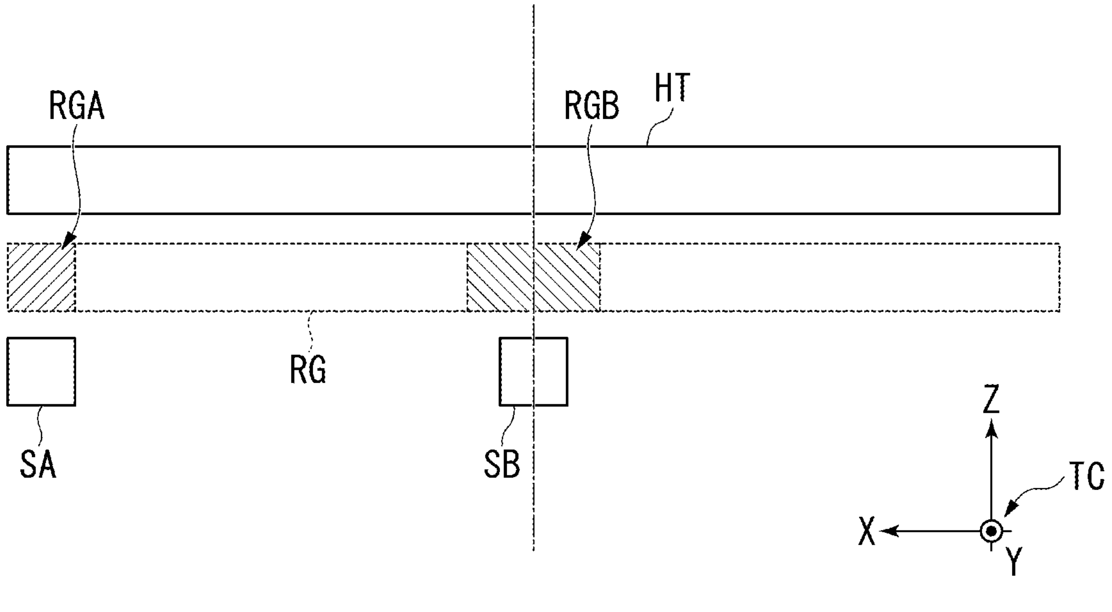
FIG. 7 is a diagram illustrating an example of a relative positional relation among each of a first detecting section and a second detecting section, a paper passing region, and the heating section.

FIG. 7 is a diagram illustrating an example of a relative positional relation among each of the first detecting section SA and the second detecting section SB, the paper passing region RG, and the heating section HT. A region RGA that is crosshatched in FIG. 7 is an example of the first region. A region RGB that is crosshatched in FIG. 7 is an example of the second region. In the example illustrated in FIG. 7, the first detecting section SA is provided in a position where the temperature of the region RGA, that is, the temperature of the first region can be detected. On the other hand, the second detecting section SB is provided in a position where the temperature of the region RGB, that is, the temperature of the second region can be detected.

In the image forming apparatus 1 having the configuration explained above, the temperature near both the ends of the paper passing region RG in the paper width direction orthogonal to the conveying direction tends to be lower than the temperature near the center of the paper passing region RG in the paper width direction. This is because heat is radiated more easily near both the ends than near the center because of the structure of the fixing device AD. Therefore, every time starting a printing operation, the image forming apparatus 1 sets (resets) a set temperature of the heating section HT to a predetermined temperature TH. The printing operation means an operation including a fixing and conveying operation for conveying a printing medium to the fixing device AD in order to fix a toner image on the printing medium. For example, the printing operation includes an operation for performing printing corresponding to a received printing job. The printing operation may include another operation including the fixing and conveying operation. The printing job means information including, together with printing data (for example, data described in a page description language) indicating an image to be printed, information for instructing the image forming apparatus 1 to form an image on a printing medium. In this embodiment, the start of the printing operation means, for example, starting the operation for performing the printing corresponding to the received printing job or resuming the operation for performing the printing temporarily stopped because of a deficiency of the conveying section H but is not limited to this. In this embodiment, the end of the printing operation means, for example, ending the operation for performing the printing or temporarily stopping the operation for performing the printing because of a deficiency of the conveying section H but is not limited to this. The deficiency of the conveying section His, for example, paper jam (jam) but is not limited to this.

By setting the set temperature of the heating section HT to the temperature TH in this way, the image forming apparatus 1 keeps the temperature near both the ends of the paper passing region RG in the paper width direction at temperature at which a fixing failure does not occur. On the other hand, the temperature of the entire paper passing region RG rises according to passage of a printing medium in the paper passing region RG. Therefore, if the printing medium passes the paper passing region RG in a state in which the set temperature of the heating section HT is kept set to the temperature TH, the temperature near both the ends sometimes excessively rises. This is undesirable because a fixing failure or the like is caused near both the ends.

In order to solve such a problem, the image forming apparatus 1 performs, according to the passage of the printing medium in the paper passing region RG, first temperature suppression control for lowering the set temperature of the heating section HT to temperature lower than the temperature TH. However, in the first temperature suppression control, the temperature near both the ends of the paper passing region RG in the paper width direction sometimes excessively rises. For example, if an elapsed time from an end of a certain printing operation XA to a start of another printing operation XB is a short time, the set temperature of the heating section HT lowered in the printing operation XA is reset to the temperature TH in the printing operation XB. For example, in the first temperature suppression control, if a deficiency that is a cause of temporarily stopping the printing operation XA is solved in a short time and the printing operation XA is immediately resumed, the set temperature of the heating section TH lowered in the printing operation XA before the temporary stop is reset to the temperature TH in the printing operation XA after the resumption. In such cases, in the first temperature suppression control, the temperature of both the ends excessively rises. The short time is a time shorter than a time required for the vicinities of both the ends to be cooled by heat radiation and is, for example, approximately several seconds to several ten seconds or approximately shorter than one minute but is not limited to this.

The image forming apparatus 1 performs second temperature suppression control in addition to the first temperature suppression control. The second temperature suppression control is control prioritized over the first temperature suppression control. The second temperature suppression control is control executed if a determination condition concerning a start of conveyance of a printing medium to the fixing device AD by the conveying section His satisfied. The second temperature suppression control is control for, in this case, lowering the set temperature of the heating section HT based on temperature detected by the first detecting section SA. Consequently, the image forming apparatus 1 can prevent the temperature of the first region from excessively rising. As a result, the image forming apparatus 1 can prevent a fixing failure from occurring near both the ends of the paper passing region RG in the paper width direction because the temperature of the first region excessively rises. The determination condition may be, as a condition serving as a trigger for starting first region temperature suppression processing, any condition if the condition is a condition concerning a start of conveyance of a printing medium to the fixing device AD by the conveying section H. For example, the determination condition is that a printing operation corresponding to a printing job received by the image forming apparatus 1 is started. The printing operation may be reworded as an operation for performing formation of an image on a printing medium corresponding to the printing job received by the image forming apparatus 1. For example, the determination condition is that a printing operation temporarily stopped because of a deficiency of the conveying section H is resumed. The printing operation may be reworded as an operation for performing formation of an image on a printing medium temporarily stopped because of a deficiency of the conveying section H. The determination condition may be another condition concerning a start of conveyance of a printing medium to the fixing device AD by the conveying section H. The image forming apparatus 1 may be configured not to perform the first temperature suppression control and to perform the second temperature suppression control. The image forming apparatus 1 may be configured to be capable of selecting, according to operation received from the user, whether to execute the first temperature suppression control. The image forming apparatus 1 may be configured to be capable of selecting, according to operation received from the user, whether to execute the second temperature suppression control.

(Temporal Change in the Set Temperature of the Heating Section by the First Temperature Suppression Control)

Figure 8:
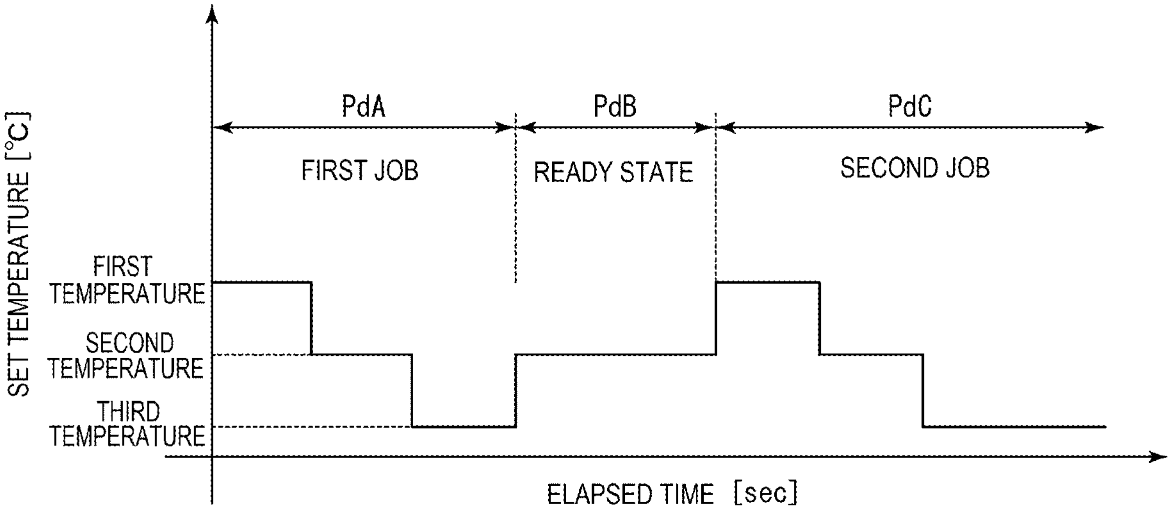
FIG. 8 is a diagram illustrating an example of a temporal change in a set temperature of the heating section by first temperature suppression control.

A temporal change in the set temperature of the heating section HT by the first temperature suppression control is explained with reference to FIG. 8. FIG. 8 is a diagram illustrating an example of a temporal change in the set temperature of the heating section HT by the first temperature suppression control. As an example, a case in which temperature that can be set for the heating section HT is three temperatures, that is, the first temperature explained above, a second temperature lower than the first temperature, and a third temperature lower than the second temperature, is explained.

The first temperature is an example of the temperature TH explained above. The first temperature is, for example, temperature lower than the highest temperature by a first predetermined temperature in a range of temperatures that can be set as the set temperature in the heating section HT. For convenience of explanation, the range is simply referred to as a settable temperature range and explained. The first predetermined temperature is, for example, approximately 5° C. However, instead of this temperature, the first predetermined temperature may be temperature lower than 5° C. or may be temperature higher than 5° C. if the temperature is temperature that can set the first temperature to temperature higher than the second temperature. The settable temperature range is, for example, a range of temperatures equal to or lower than the highest temperature at which a fixing failure does not occur in the paper passing region RG and equal to or higher than the lowest temperature at which a fixing failure does not occur in the paper passing region RG. The first temperature may be the highest temperature instead of the temperature lower than the highest temperature by the first predetermined temperature in the settable temperature range. The settable temperature range may be a range other than the range of temperatures equal to or lower than the highest temperature at which a fixing failure does not occur in the paper passing region RG and equal to or higher than the lowest temperature at which a fixing failure does not occur in the paper passing region RG. In this case, the control section 110 sets, in the heating section HT, each of the first temperature, the second temperature, and the third temperature as temperature within the range of temperatures equal to or lower than the highest temperature at which a fixing failure does not occur in the paper passing region RG and equal to or higher than the lowest temperature at which a fixing failure does not occur in the paper passing region RG.

The second temperature may be any temperature if the temperature is, for example, temperature lower than the first temperature and higher than the third temperature.

The third temperature is, for example, the lowest temperature in the settable temperature range. The third temperature may be, instead of the lowest temperature in the settable temperature range, temperature higher than the lowest temperature if the temperature is temperature lower than the second temperature.

The horizontal axis of a graph illustrated in FIG. 8 indicates an elapsed time. The vertical axis of the graph indicates a set temperature set for the heating section HT. A period PdA illustrated in FIG. 8 indicates an example of a period in which a printing operation corresponding to a first printing job received by the image forming apparatus 1 is performed by the image forming apparatus 1 in a period drawn on the graph. In FIG. 8, the printing job is indicated by “first job”. A period PdC illustrated in FIG. 8 indicates an example of a period in which a printing operation corresponding to a second printing job received by the image forming apparatus 1 is performed by the image forming apparatus 1 in a period drawn on the graph. In FIG. 8, the printing job is indicated by “second job”. A period PdB illustrated in FIG. 8 indicates an example of a period in which the image forming apparatus 1 is not performing a printing operation between the period PdA and the period PdC. The period PdB can be reworded as a period from an end of the printing operation in the period PdA to a start of the printing operation in the period PdC. In FIG. 8, a state in which the image forming apparatus 1 is not performing a printing operation is indicated by “ready state”.

In the first temperature suppression control, if starting a printing operation corresponding to a received printing job, the image forming apparatus 1 sets (resets) the set temperature of the heating section HT to the first temperature. Thereafter, in the first temperature suppression control, the image forming apparatus 1 lowers the set temperature of the heating section HT to the second temperature and the third temperature in order according to passage of a printing medium in the paper passing region RG. Specifically, in the first temperature suppression control, if the number of times the printing medium passes the paper passing region RG is equal to or more than a threshold ThA, the image forming apparatus 1 lowers the set temperature of the heating section HT from the first temperature to the second temperature. In the first temperature suppression control, if the number of times the printing medium passes the paper passing region RG is equal to or more than a threshold ThB larger than the threshold ThA, the image forming apparatus 1 lowers the set temperature of the heating section HT from the second temperature to the third temperature. Therefore, as illustrated in FIG. 8, the set temperature of the heating section HT changes to the first temperature, the second temperature, and the third temperature in order between timing when the period PdA starts and timing when the period PdA ends. Such circumstances are the same for the period PdC.

On the other hand, in the example illustrated in FIG. 8, in the first temperature suppression control, the image forming apparatus 1 sets the set temperature of the heating section HT to the second temperature in the period PdB. This is to prevent the first region from being excessively cooled to make it difficult for the temperature of the first region to rise in the period PdB. Therefore, in the image forming apparatus 1, the set temperature of the heating section HT is sometimes set to the first temperature at timing when the period PdB ends while the temperature of the first region does not fall and the period PdC is started. As explained above, this is likely to cause an excessive rise in the temperature of the first region corresponding to the passage of the printing medium in the paper passing region RG.

The set temperature set for the heating section HT in the period PdB may be the first temperature or may be the third temperature instead of the second temperature. However, for example, even if the set temperature of the heating section HT is not maintained at the second temperature and is the third temperature in the period PdB, an excessive rise in the temperature of the first region corresponding to the passage of the printing medium in the paper passing region RG is sometimes caused. This is because, for example, if the period PdB is the short time explained above, even if the set temperature of the heating section HT is the third temperature, the temperature of the first region sometimes excessively rises according to the passage of the printing medium in the paper passing region RG in the period PdC. On the other hand, for example, if the set time set for the heating section HT in the period PdB is the first temperature, it is more likely that the temperature of the first region excessively rises according to the passage of the printing medium in the paper passing region RG. From such circumstances, as explained above, the image forming apparatus 1 performs the second temperature suppression control as the control prioritized over the first temperature suppression control.

(Temporal Change in the Set Temperature of the Heating Section by the Second Temperature Suppression Control)

Figure 9:
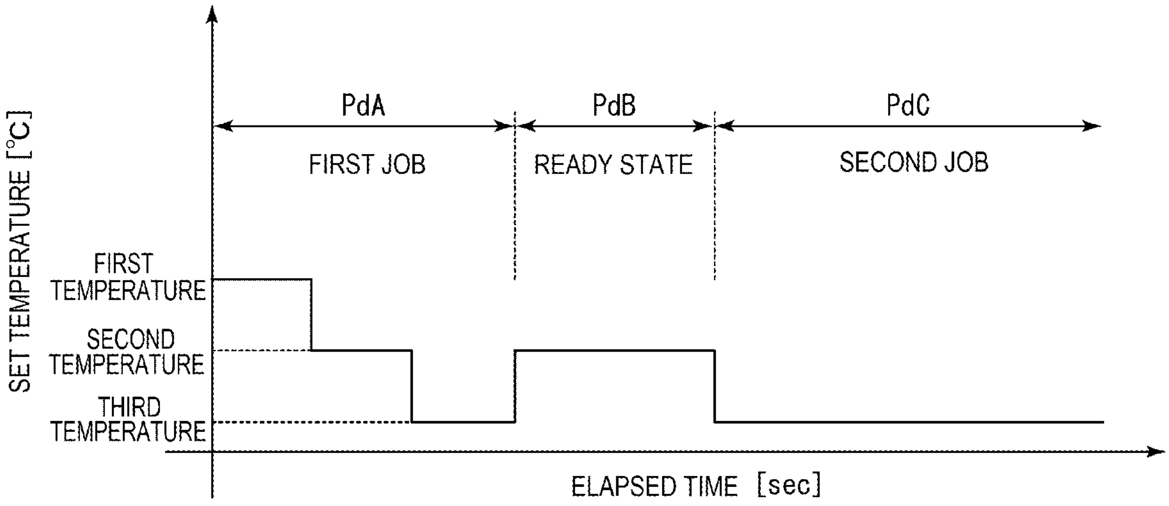
FIG. 9 is a diagram illustrating an example of a temporal change in a set temperature of the heating section by second temperature suppression control.

A temporal change in the set temperature of the heating section HT by the second temperature suppression control is explained with reference to FIG. 9. FIG. 9 is a diagram illustrating an example of the temporal change in the set temperature of the heating section HT by the second temperature suppression control.

In FIG. 9, a change in the set temperature in each of the period PdA, the period PdB, and the period PdC illustrated in FIG. 8 is illustrated. The horizontal axis and the vertical axis of a graph illustrated in FIG. 9 are the same as the horizontal axis and the vertical axis of the graph illustrated in FIG. 8. As an example, a case in which temperature detected by the first detecting section SA exceeds the first temperature at timing when the period PdC starts is explained. In this case, in the second temperature suppression control executed at the timing when the period PdC starts, the set temperature of the heating section HT is lowered to temperature lower than the first temperature. In the example illustrated in FIG. 9, in the second temperature suppression control, the set temperature is lowered from the second temperature to the third temperature at the timing. Consequently, the image forming apparatus 1 can prevent the temperature of the first region from excessively rising. As a result, the image forming apparatus 1 can prevent a fixing failure from occurring at both the ends of the paper passing region RG in the paper width direction because the temperature of the first region excessively rises. However, in FIG. 9, in order to prevent the figure from becoming complicated, a state in which the set temperature of the heating section HT is reset to the first temperature at timing before the set temperature is lowered from the second temperature to the third temperature is omitted.

(Functional Configuration of the Control Section)

Figure 10:
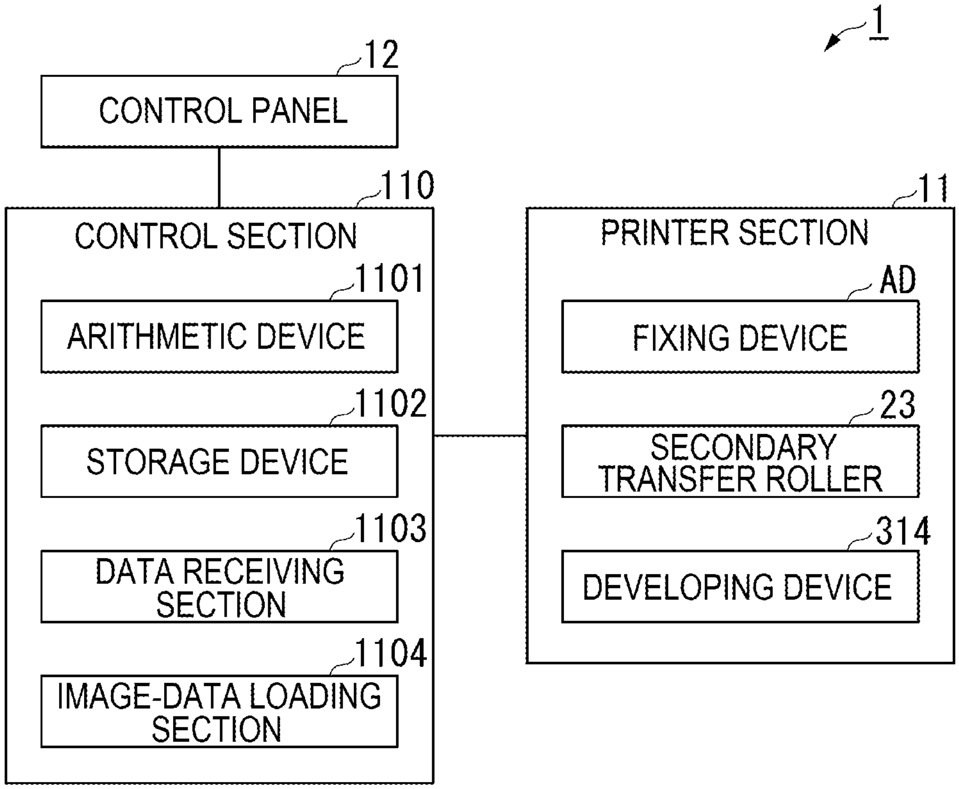
FIG. 10 is a diagram illustrating an example of a functional configuration of a control section.

Subsequently, a functional configuration of the control section 110 is explained with reference to FIG. 10. FIG. 10 is a diagram illustrating an example of the functional configuration of the control section 110.

As illustrated in FIG. 10, the control section 110 is communicably connected to each of the printer section 11 and the control panel 12. The control section 110 includes an arithmetic device 1101, a storage device 1102, a data receiving section 1103, and an image-data loading section 1104.

The arithmetic device 1101 is, for example, a central processing unit (CPU) or an application specific integrated circuit (ASIC). The arithmetic device 1101 controls each of the printer section 11 and the control panel 12 according to an image processing program stored in the storage device 1102.

The storage device 1102 is a read only memory (ROM), a random access memory (RAM), a hard disk drive (HDD), a solid state drive (SSD), or the like. The storage device 1102 may be separate from the control section 110.

The data receiving section 1103 (e.g., a communication interface) receives a printing job from a host such as a personal computer (PC) and stores printing data included in the received printing job in the storage device 1102. The data receiving section 1103 is an example of the receiving section.

For example, the image-data loading section 1104 determines printing conditions from the printing data stored in the storage device 1102 by the data receiving section 1103 to load data (for example, raster data) printable by the printer section 11 and stores the data in the storage device 1102.

(Processing for Performing the Second Temperature Suppression Control)

Figure 11:
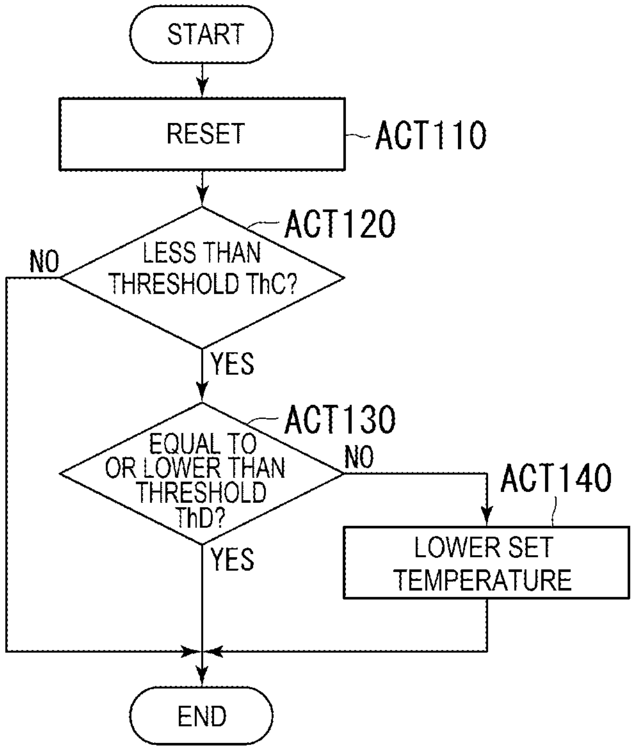
FIG. 11 is a diagram illustrating an example of a flow of processing for performing the second temperature suppression control.

Processing for performing the second temperature suppression control is explained with reference to FIG. 11. FIG. 11 is a diagram illustrating an example of a flow of the processing for performing the second temperature suppression control. The image forming apparatus 1 repeatedly performs the processing of the flowchart of FIG. 11, for example, every time the determination condition explained above is satisfied.

After the determination condition is satisfied, the control section 110 sets the set temperature of the heating section HT to the first temperature (ACT 110). In FIG. 11, the processing in ACT 110 is indicated by "reset". In the flowchart of FIG. 11, the processing in ACT 110 may be omitted. In the flowchart, the processing in ACT 110 may be executed in a period of transition from processing in ACT 120 to processing in ACT 130. In the flowchart, the processing in ACT 110 may be executed in a period until the processing of the flowchart ends not through the processing in ACT 130 to processing in ACT 140.

Subsequently, the control section 110 determines whether an elapsed time from timing closest to the present time among timings when printing operations end to the present time is less than a predetermined threshold ThC (ACT 120). For convenience of explanation, the elapsed time is referred to as target elapsed time and explained. In FIG. 11, the processing in ACT 120 is indicated by "less than threshold ThC?". The threshold ThC is a time required until the temperature of the first region is lowered to temperature equal to or lower than a threshold ThD predetermined for the temperature of the first region by heat radiation by air cooling and is determined by an experiment, a simulation, or the like performed beforehand. The threshold ThC is, for example, one minute but may be a time shorter than one minute or may be a time longer than one minute. The threshold ThD is temperature lower than the highest temperature by a second predetermined temperature in the settable temperature range. The second predetermined temperature may be the same temperature as the first predetermined temperature, may be temperature lower than the first predetermined temperature, or may be temperature higher than the first predetermined temperature. As an example, a case in which the second predetermined temperature is the same temperature as the first predetermined temperature is explained. In this case, the threshold ThD is the first temperature. In this case, if the temperature of the first region is temperature higher than the first temperature, the image forming apparatus 1 can lower the set temperature of the heating section HT to temperature lower than the first temperature according to the flowchart of FIG. 11. The threshold ThC is an example of the second threshold. The threshold ThD is an example of the first threshold. In the flowchart of FIG. 11, the processing in ACT 120 may be omitted.

If determining that the target elapsed time is equal to or more than the threshold ThC (NO in ACT 120), the control section 110 ends the processing of the flowchart of FIG. 11. This is because, in this case, it is estimated that the temperature of the first region falls to the threshold ThD or less.

On the other hand, if determining that the target elapsed time is less than the threshold ThC (YES in ACT 120), the control section 110 specifies, as the temperature of the first region, temperature indicated by information acquired from the first detecting section SA. After specifying the temperature, the control section 110 determines whether the specified temperature is equal to or lower than the threshold ThD (ACT 130). In FIG. 11, the processing in ACT 130 is indicated by "equal to or lower than threshold ThD?".

If determining that the specified temperature of the first region is equal to or lower than the threshold ThD (YES in ACT 130), the control section 110 maintains the set temperature of the heating section HT, starts the first temperature suppression control, and ends the processing of the flowchart of FIG. 11. For example, the control section 110 stops, at timing when the determination condition is satisfied next, the first temperature suppression control started in this way. Consequently, the image forming apparatus 1 can more preferentially execute the second temperature suppression control than the first temperature suppression control. If the image forming apparatus 1 does not perform the first temperature suppression control, after determining that the specified temperature of the first region is equal to or lower than the threshold ThD, the control section 110 does not start the first temperature suppression control and ends the processing.

On the other hand, if determining that the specified temperature of the first region is higher than the threshold ThD (NO in ACT 130), the control section 110 lowers the set temperature of the heating section HT from the first temperature (ACT 140). In FIG. 11, the processing in ACT 140 is indicated by "lower set temperature". In this embodiment, the temperatures that can be set for the heating section HT are the three temperatures of the first temperature, the second temperature, and the third temperature. Therefore, in ACT 140, the control section 110 lowers the set temperature of the heating section HT from the first temperature to the second temperature or the third temperature. In other words, in ACT 140, the control section 110 resets the set temperature of the heating section HT from the first temperature to the second temperature or the third temperature. As explained above, the temperature of the first region rises according to the passage of the printing medium in the paper passing region RG. Therefore, in ACT 140, the control section 110 desirably lowers the set temperature of the heating section HT to the lowest temperature among the temperatures that can be set for the heating section HT. In this embodiment, the lowest temperature is the third temperature. After lowering the set temperature in ACT 140, the control section 110 ends the processing of the flowchart of FIG. 11. That is, after the set temperature is lowered in ACT 140, the image forming apparatus 1 maintains the set temperature of the heating section HT at the temperature reset in ACT 140 at least in a period until timing when the determination condition is satisfied next. The image forming apparatus 1 may be configured to lower the set temperature of the heating section HT stepwise according to an elapsed time, the number of prints, and the like in ACT 140.

As explained above, if the determination condition concerning the start of the conveyance of the printing medium to the fixing device AD by the conveying section H is satisfied and if the temperature detected by the first detecting section SA is higher than the threshold ThD, the image forming apparatus 1 lowers the set temperature of the heating section HT. Consequently, the image forming apparatus 1 can prevent the temperature of the first region from excessively rising. As a result, the image forming apparatus 1 can prevent a fixing failure from occurring at both the ends of the paper passing region RG in the paper width direction because the temperature of the first region excessively rises.

Figure 12:
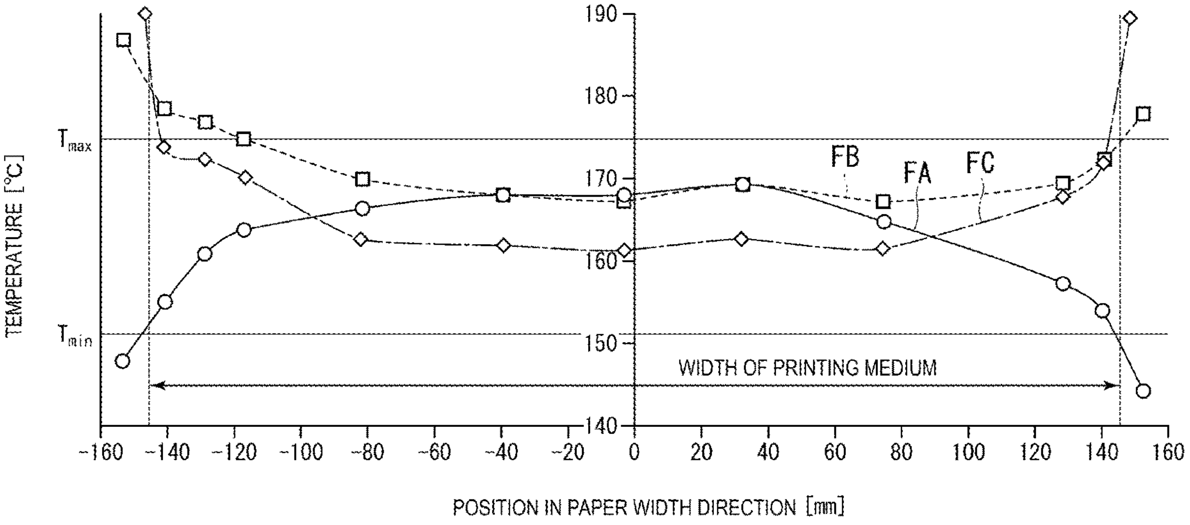
FIG. 12 is a diagram for comparing changes in a temperature distribution of the paper passing region in the first temperature suppression control and the second temperature suppression control.

FIG. 12 is a diagram for comparing changes in a temperature distribution of the paper passing region RG in the first temperature suppression control and the second temperature suppression control. In an example illustrated in FIG. 12, a case in which the image forming apparatus 1 performs printing operations corresponding to a first printing job and a second printing job in order is explained. The horizontal axis of a graph illustrated in FIG. 12 indicates a position on the paper passing region RG in the paper width direction. The origin of the horizontal axis indicates the center of the paper passing region RG in the paper width direction. The vertical axis of the graph indicates temperature. A curved line FA plotted in the graph indicates a temperature distribution in positions on the paper passing region RG in the paper width direction immediately after the image forming apparatus 1 ends the printing operation corresponding to the first printing job. The curved line FA plotted in the graph indicates a temperature distribution in the positions on the paper passing region RG in the paper width direction immediately after the printing operation corresponding to the first printing job ends. A curved line FB plotted in the graph indicates a temperature distribution in the positions on the paper passing region RG in the paper width direction immediately after the printing operation corresponding to the second printing job ends. However, the temperature distribution indicated by the curved line FB is a temperature distribution obtained as a result of the image forming apparatus 1 performing the first temperature suppression control. On the other hand, a curved line FC plotted in the graph also indicates a temperature distribution in the positions on the paper passing region RG in the paper width direction immediately after the printing operation corresponding to the second printing job ends. However, the temperature distribution indicated by the curved line FC is a temperature distribution obtained as a result of the image forming apparatus 1 performing the second temperature suppression control.

Positions indicated by dotted lines on the graph illustrated in FIG. 12 among positions on the paper passing region RG in the paper width direction are positions of both the ends of the paper passing region RG in the paper width direction. That is, temperature near the positions indicated by the dotted lines is an example of the temperature of the first region. Temperature Tmax illustrated in the graph indicates an example of the highest temperature at which a fixing failure does not occur in the paper passing region RG. Temperature Tmin illustrated in the graph indicates an example of the lowest temperature at which a fixing failure does not occur in the paper passing region RG. If viewing the curved line FB based on the above, it is seen that, in the first temperature suppression control, the temperature of regions up to positions respectively separated from both the ends by approximately 25 [mm] exceeds the temperature Tmax. On the other hand, if viewing the curved line FC, it is seen that the temperature of regions up to positions respectively separated from both the ends by approximately 5 [mm] exceeds the temperature Tmax. This indicates that, compared with the first temperature suppression control, the second temperature suppression control can prevent the temperature of the first region from excessively rising. In other words, this indicates that it is possible to prevent a fixing failure from occurring at both the ends of the paper passing region RG in the paper width direction. Therefore, the image forming apparatus 1 can prevent the temperature of the first region from excessively rising. As a result, the image forming apparatus 1 can prevent a fixing failure from occurring at both the ends of the paper passing region RG in the paper width direction because the temperature of the first region excessively rises.

The determination condition explained above may include a plurality of conditions. In this case, for example, the plurality of conditions include a condition that a printing operation corresponding to a printing job received by the image forming apparatus 1 is started and a condition that a printing operation temporarily stopped because of a deficiency (e.g., fault) of the conveying section His resumed. In this case, the image forming apparatus 1 determines that the determination condition is satisfied if at least one of the plurality of conditions is satisfied.

The target elapsed time explained above is different depending on a condition satisfied as the determination condition. For example, if the determination condition is that a printing operation corresponding to a printing job received by the image forming apparatus 1 is started, the target elapsed time is an elapsed time from an end of a printing operation corresponding to a printing job received last time by the image forming apparatus 1. For example, if the determination condition is that a printing operation temporarily stopped because of a deficiency of the conveying section His resumed, the target elapsed time is an elapsed time from the temporary stop of the printing operation due to the deficiency.

The image forming apparatus 1 explained above may determine whether the difference between the temperature of the first region and the temperature of the second region is equal to or smaller than the threshold ThD instead of determining whether the temperature of the first region is equal to or lower than the threshold ThD in ACT 130. In this case, the threshold ThD is determined by an experiment, a simulation, or the like performed beforehand such that the temperature of the first region is prevented from excessively rising by the second temperature suppression control. Therefore, the image forming apparatus 1 can prevent the temperature of the first region from excessively rising. As a result, the image forming apparatus 1 can prevent a fixing failure from occurring at both the ends of the paper passing region RG in the paper width direction because the temperature of the first region excessively rises.

As explained above, an image forming apparatus (in the example explained above, the image forming apparatus 1) according to the embodiment includes a conveying section (in the example explained above, the conveying section H), an image forming section (in the example explained above, each of the four sets of image forming stations), a fixing device (in the example explained above, the fixing device AD), and a control section (in the example explained above, the control section 110). The conveying section conveys a printing medium. The image forming section forms an image on the printing medium. The fixing device includes a fixing roller (in the example explained above, the fixing member ADA), a pressurizing roller (in the example explained above, the pressurizing member ADB) opposed to the fixing roller, and a heating section (in the example explained above, the heating section HT) that heats a paper passing region (in the example explained above, the paper passing region RG) where the printing medium passes between the fixing roller and the pressurizing roller. The fixing device heats the printing medium passing the paper passing region with the heating of the paper passing region by the heating section and fixes, on the printing medium, an image formed on the printing medium by the image forming section. If a determination condition concerning a start of the conveyance of the printing medium to the fixing device by the conveying section is satisfied and if temperature detected by a detecting section (in the example explained above, the first detecting section SA) that detects the temperature of, among regions included in the paper passing region, a first region that is a region at one or both of both the ends in the paper width direction orthogonal to a direction in which the printing medium passes the paper passing region is higher than a first threshold (in the example explained above, the threshold ThD), the control section lowers a set temperature of the heating section. Consequently, the image forming apparatus can prevent the temperature of the first region from excessively rising. As a result, the image forming apparatus can prevent a fixing failure from occurring at both the ends of the paper passing region in the paper width direction because the temperature of the first region excessively rises.

In the image forming apparatus, a configuration may be used in which, if the determination condition is satisfied and if the temperature detected by the detecting section is higher than the first threshold, the control section lowers the set temperature of the heating section from a first temperature among temperatures that can be set for the heating section to a second temperature lower than the first temperature among the temperatures that can be set for the heating section.

A configuration may be used in which the image forming apparatus includes a receiving section (in the example explained above, the data receiving section 1103) that receives a printing job including information for instructing formation of an image on the printing medium, and the determination condition is that an operation for performing the formation of the image on the printing medium corresponding to the printing job received by the receiving section is started.

In the image forming apparatus, a configuration may be used in which, if the determination condition is satisfied, the control section resets the set temperature of the heating section to the first temperature among the temperatures that can be set for the heating section and, then, determines whether temperature detected by the detecting section is higher than the first threshold.

In the image forming apparatus, a configuration may be used in which, after resetting the set temperature of the heating section if the determination condition is satisfied, the control section determines whether an elapsed time (in the example explained above, the target elapsed time) from an end of an operation for performing formation of an image on the printing medium corresponding to a printing job received last time by the receiving section is smaller than a second threshold (in the example explained above, the threshold ThC), if determining that the elapsed time is less than the second threshold, determines whether the temperature detected by the detecting section is higher than the first threshold, and, if determining that the elapsed time is equal to or more than the second threshold, does not determine whether the temperature detected by the detecting section is higher than the first threshold.

In the image forming apparatus, a configuration may be used in which the control section sets the set temperature of the heating section in the elapsed time to temperature higher than the lowest temperature among the temperatures that can be set for the heating section and temperature lower than the highest temperature among the temperatures that can be set for the heating section.

In the image forming apparatus, a configuration may be used in which the determination condition is that an operation for performing formation of an image on the printing medium temporarily stopped because of a deficiency of the conveying section is resumed.

In the image forming apparatus, a configuration may be used in which, if the determination condition is satisfied, the control section resets the set temperature of the heating section to the first temperature among the temperatures that can be set for the heating section and, then, determines whether the temperature detected by the detecting section is higher than the first threshold.

In the image forming apparatus, a configuration may be used in which, after resetting the set temperature of the heating section if the determination condition is satisfied, the control section determines whether an elapsed time from a temporary stop of an operation for forming an image on the printing medium due to a deficiency is less than the second threshold, if determining that the elapsed time is less than the second threshold, determines whether the temperature detected by the detecting section is higher than the first threshold, and, if determining that the elapsed time is equal to or less than the second threshold, does not determine whether the temperature detected by the detecting section is higher than the first threshold.

In the image forming apparatus, a configuration may be used in which the heating section is provided in contact with the fixing roller on the inside of the fixing roller, includes a heat generating section (in the example explained above, the heat generating section HE) that generates heat with a predetermined heating method, and heats the paper passing region according to rotation of the fixing roller heated by the heat generation of the heat generating section, and the heat generating section is an undivided single member and includes, on the inside, one or more heat generating bodies (in the example explained above, each of the heat generating bodies HEA to HEG and MG) that generate heat with the heating method.

Several embodiments are explained above. These embodiments are presented as examples and are not intended to limit the scope of an invention. These embodiments can be carried out in other various forms. Various omissions, substitutions, and changes can be made in a range not departing from the gist of the invention. These embodiments and modifications thereof are included in the scope and the gist of the invention and are included in the inventions described in the claims and a scope of equivalents of the inventions.

A program for realizing functions of any constituent sections in the apparatus (for example, the image forming apparatus 1) explained above may be recorded in a computer-readable recording medium and read and executed by a computer system. The "computer system" referred to herein includes an operating system (OS) and hardware such as peripheral equipment. The "computer-readable recording medium" means a portable medium such as a flexible disk, a magneto-optical disk, a ROM, or a compact disk (CD)-ROM or a storage device such as a hard disk incorporated in the computer system. Further, the "computer-readable recording medium" includes a recording medium that stores a program for a fixed time like a volatile memory (a RAM) inside the computer system functioning as a server or a client in the case in which the program is transmitted via a network such as the Internet or a communication line such as a telephone line.

The program may be transmitted from the computer system storing the program in the storage device or the like to another computer system via a transmission medium or by a transmission wave in the transmission medium. The "transmission medium" for transmitting the program means a medium having a function of transmitting information like a network (a communication network) such as the Internet or a communication line (a communication wire) such as a telephone line. The program may be a program for realizing a part of the functions explained above. Further, the program may be a program that can realize the functions explained above in combination with a program already recorded in the computer system, a so-called differential file (a differential program).

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. An image forming apparatus comprising:

a conveyor configured to convey a printing medium;

an image forming station configured to form an image on the printing medium;

a fixing device including a fixing roller, a pressurizing roller positioned opposite the fixing roller, and a heater configured to heat a paper passing region between the fixing roller and the pressurizing roller, the fixing device being configured fix the image on the printing medium by heating the printing medium as the printing medium passes through the paper passing region;

a temperature sensor configured to detect a temperature of a first region, the first region including an end of the paper passing region in a paper width direction, the paper width direction being orthogonal to a movement direction of the printing medium through the paper passing region; and a controller configured to lower a set temperature of the heater in response to a determination that (a) a determination condition is satisfied, the determination condition relating to a start of the conveyance of the printing medium to the fixing device by the conveyor and (b) the temperature detected by the temperature sensor is higher than a threshold temperature.

2. The image forming apparatus of claim 1, wherein, in response to the determination that (a) the determination condition is satisfied and (b) the temperature detected by the temperature sensor is higher than the threshold temperature, the controller is configured to lower the set temperature of the heater from a first temperature to a second temperature lower than the first temperature, the first temperature and the second temperature being among a list of predetermined set temperatures stored by the controller.

3. The image forming apparatus of claim 1, further comprising a communication interface configured to receive a printing job including information for instructing formation of the image on the printing medium, wherein the determination condition is that an operation for performing the formation of the image on the printing medium corresponding to the printing job received by the communication interface has been started.

4. The image forming apparatus of claim 3, wherein, in response to a determination that the determination condition is satisfied, the controller is configured to reset the set temperature of the heater to a first predetermined temperature and subsequently determine if the temperature detected by the temperature sensor is higher than the threshold temperature.

5. The image forming apparatus of claim 4, wherein the controller is configured to:

after resetting the set temperature of the heater in response to the determination that the determination condition is satisfied, determine if an elapsed time after an end of the operation for performing the formation of the image is less than a threshold time;

in response to a determination that the elapsed time is less than the threshold time, determine if the temperature detected by the temperature sensor is higher than the threshold temperature; and in response to a determination that the elapsed time is greater than or equal to the threshold time, proceed without lowering the set temperature.

6. The image forming apparatus of claim 5, wherein the controller is configured to store a list of predetermined set temperatures for the heater, the list including the first predetermined temperature, a second predetermined temperature lower than the first predetermined temperature, and a third predetermined temperature lower than the first predetermined temperature.

7. The image forming apparatus of claim 1, wherein the determination condition is that formation of the image on the printing medium has resumed after being temporarily stopped in response to a fault of the conveyor.

8. The image forming apparatus of claim 7, wherein, in response to a determination that the determination condition is satisfied, the controller is configured to reset the set temperature of the heater to a first predetermined temperature and subsequently determine if the temperature detected by the temperature sensor is higher than the threshold temperature.

9. The image forming apparatus of claim 8, wherein the controller is configured to:

after resetting the set temperature of the heater in response to the determination that the determination condition is satisfied, determine if an elapsed time after the formation of the image is temporarily stopped in response to the fault is less than a threshold time;

in response to a determination that the elapsed time is less than the threshold time, determine if the temperature detected by the temperature sensor is higher than the threshold temperature; and in response to a determination that the elapsed time is greater than or equal to the threshold time, proceed without lowering the set temperature.

10. The image forming apparatus of claim 1, wherein:

the heater is positioned in contact with an inside surface of the fixing roller, the heater includes a heat generating section configured to generate heat using a predetermined heating method, and the heater heats the paper passing region according to rotation of the fixing roller heated by the heat generation of the heat generating section; and the heat generating section is an undivided single member and includes one or more heat generating bodies that generate the heat with the heating method.

11. The image forming apparatus of claim 10, wherein the heating method is resistive heating.

12. A method for forming an image on a printing medium, the method comprising:

conveying, by a conveyor, the printing medium in a movement direction through a paper passing region of a fixing device, the paper passing region being positioned between a fixing roller and a pressurizing roller of the fixing device;

heating, by a heater of the fixing device, the printing medium to fix an image on the printing medium;

detecting, by a temperature sensor, a temperature of a first region, the first region including an end of the paper passing region in a paper width direction, the paper width direction being orthogonal to the movement direction;

determining if a determination condition is satisfied, the determination condition relating to a start of the conveyance of the printing medium to the fixing device by the conveyor;

lowering a set temperature of the heater in response to a determination that (a) the determination condition is satisfied and (b) the temperature detected by the temperature sensor is higher than a threshold temperature.

13. The method of claim 12, further comprising receiving a printing job including information for instructing formation of the image on the printing medium, wherein the determination condition is that an operation for performing the formation of the image on the printing medium corresponding to the printing job received by the communication interface has been started.

14. The method of claim 13, wherein lowering the set temperature includes, in response to the determination that the determination condition is satisfied, resetting the set temperature of the heater to a first predetermined temperature and subsequently determining if the temperature detected by the temperature sensor is higher than the threshold temperature.

15. The method of claim 14, wherein lowering the set temperature includes:

after resetting the set temperature of the heater in response to the determination that the determination condition is satisfied, determining if an elapsed time after an end of the operation for performing the formation of the image is less than a threshold time;

in response to a determination that the elapsed time is less than the threshold time, determining if the temperature detected by the temperature sensor is higher than the threshold temperature; and in response to a determination that the elapsed time is greater than or equal to the threshold time, proceeding without lowering the set temperature.

16. The method of claim 15, further comprising storing a list of predetermined set temperatures for the heater, the list including the first predetermined temperature, a second predetermined temperature lower than the first predetermined temperature, and a third predetermined temperature lower than the first predetermined temperature.

17. The method of claim 12, wherein the determination condition is that formation of the image on the printing medium has resumed after being temporarily stopped in response to a fault of the conveyor.

18. The method of claim 17, wherein lowering the set temperature includes, in response to the determination that the determination condition is satisfied, resetting the set temperature of the heater to a first predetermined temperature and subsequently determining if the temperature detected by the temperature sensor is higher than the threshold temperature.

19. The method of claim 18, wherein lowering the set temperature includes:

after resetting the set temperature of the heater in response to the determination that the determination condition is satisfied, determining if an elapsed time after the formation of the image is temporarily stopped in response to the fault is less than a threshold time;

in response to a determination that the elapsed time is less than the threshold time, determining if the temperature detected by the temperature sensor is higher than the threshold temperature; and in response to a determination that the elapsed time is greater than or equal to the threshold time, proceeding without lowering the set temperature.

20. A non-transitory computer readable medium including instructions stored thereon that, when processed by at least one processor, cause a device to perform operations comprising:

controlling a conveyor to convey a printing medium in a movement direction through a paper passing region of a fixing device, the paper passing region being positioned between a fixing roller and a pressurizing roller of the fixing device;

controlling a heater of the fixing device to fix an image on the printing medium;

receiving, from a temperature sensor, a measured temperature of a first region, the first region including an end of the paper passing region in a paper width direction, the paper width direction being orthogonal to the movement direction;

determining if a determination condition is satisfied, the determination condition relating to a start of the conveyance of the printing medium to the fixing device by the conveyor;

lowering a set temperature of the heater in response to a determination that (a) the determination condition is satisfied and (b) the measured temperature is higher than a threshold temperature.

* * * * *